United States Patent

Fleck

[11] 4,024,017
[45] May 17, 1977

[54] METHOD AND APPARATUS FOR MEASURING BURN-UP OF NUCLEAR FUEL IN A REACTOR

[76] Inventor: Carl M. Fleck, Goldegg-Gasse 1/13, A-1040 Vienna, Austria

[22] Filed: Aug. 27, 1974

[21] Appl. No.: 500,943

[30] Foreign Application Priority Data

Aug. 27, 1973 Austria .............................. 7420/73
Jan. 15, 1974 Austria .............................. 327/74

[52] U.S. Cl. ............................................. 176/19 R
[51] Int. Cl.² ........................................ G21C 17/06
[58] Field of Search ............. 176/19; 250/390, 391, 250/392

[56] References Cited

UNITED STATES PATENTS

| | | | |
|---|---|---|---|
| 2,920,204 | 1/1960 | Youmans | 250/83.1 |
| 3,070,538 | 12/1962 | Spinrab et al. | 176/25 |
| 3,160,567 | 12/1964 | Steinberg et al. | 176/19 |
| 3,222,521 | 12/1965 | Einfeld | 250/391 |
| 3,263,081 | 7/1966 | Wiesemann et al. | 250/83.3 |
| 3,375,371 | 3/1968 | Puechl | 250/391 |
| 3,496,357 | 2/1970 | Weinzierl et al. | 250/391 |
| 3,650,894 | 3/1972 | Rausch et al. | 176/19 R |
| 3,699,338 | 10/1972 | Baumann et al. | 250/391 |
| 3,755,675 | 8/1973 | Stepan et al. | 176/19 R |
| 3,780,292 | 12/1973 | Klar | 250/390 |
| 3,845,311 | 10/1974 | Fujii | 250/930 |
| 3,899,676 | 8/1975 | Goldstein et al. | 250/390 |

OTHER PUBLICATIONS

Glasstone & Sesonske, "Nuclear Reactor Engineering," Van Nostrand Co., Princeton, N.J., pp. 695–699.

*Primary Examiner*—Samuel W. Engle
*Assistant Examiner*—S. A. Cangialosi
*Attorney, Agent, or Firm*—Kurt Kelman

[57] ABSTRACT

The burn-up of nuclear fuel in a reactor is measured by producing two measuring signals, each of which is a function of the flux of a different neutron energy or group, and comparing the two signals to compute the burn-up.

16 Claims, 6 Drawing Figures

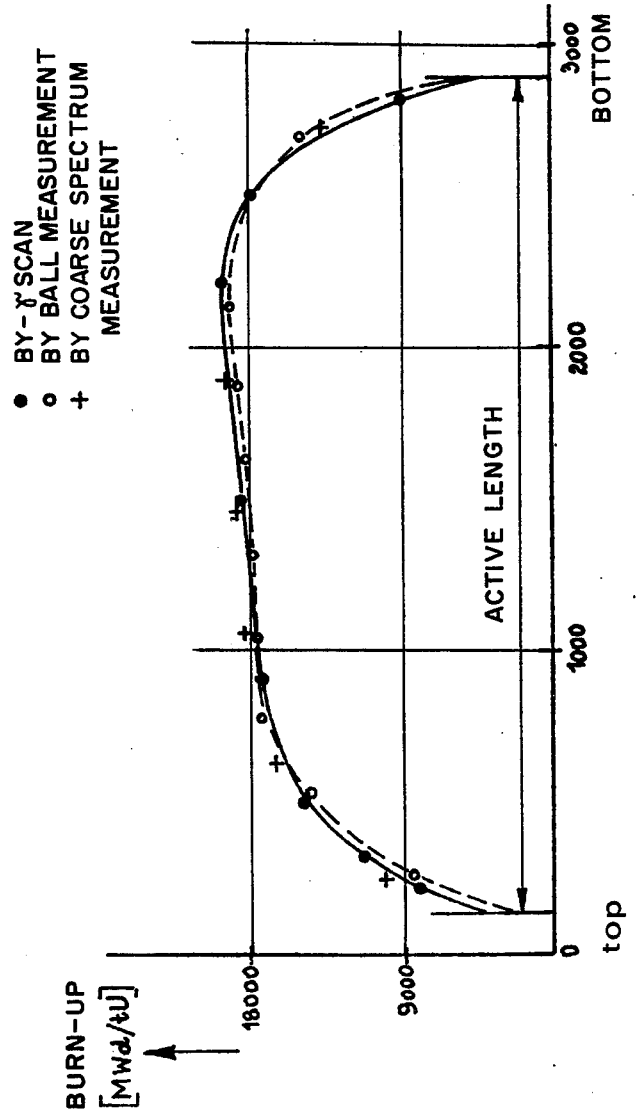

METHOD AND APPARATUS FOR MEASURING BURN-UP OF NUCLEAR FUEL IN A REACTOR

The present invention relates to a method of, and apparatus for, measuring burn-up of nuclear fuel in a nuclear reactor.

Safety as well as economic conditions make it imperative to have accurate knowledge of the local burn-up in nuclear power reactors and thus to be able dependably to avoid power density peaks, on the one hand, and to adjust the operating conditions to optimum fuel utilization, on the other hand, when the local burn-up of the nuclear fuel in the reactor core is known.

Furthermore, the inherent stability of the reactor depends on the form of the neutron flux distribution and, therefore, on the burn-up condition.

In essence, conventional on-line methods for determining the burn-up in a nuclear reactor are based on a time integral of the neutron flux or on a time integral of the power density, which requires the continuous measurement of the neutron flux in the core and storing the measured data. This is disadvantageous not only because of the possible loss of data but this method is also inaccurate if large control rod movements of long duration were necessary between the individual measurements, for instance at irregular cycles or peak power cycling.

It is the primary object of this invention to provide a method and apparatus avoiding these disadvantages of conventional nuclear fuel burn-up measurements.

The above and other objects are accomplished in accordance with the invention by producing two measuring signals, each measuring signal being the function of the flux density of a different neutron group or energy, and computing the burn-up by comparing the two signals.

In principle, this novel measuring system is based on the change in the epithermal/thermal flux ratio or a similar ratio as a function of the burn-up condition of the reactor fuel.

Figure 3:
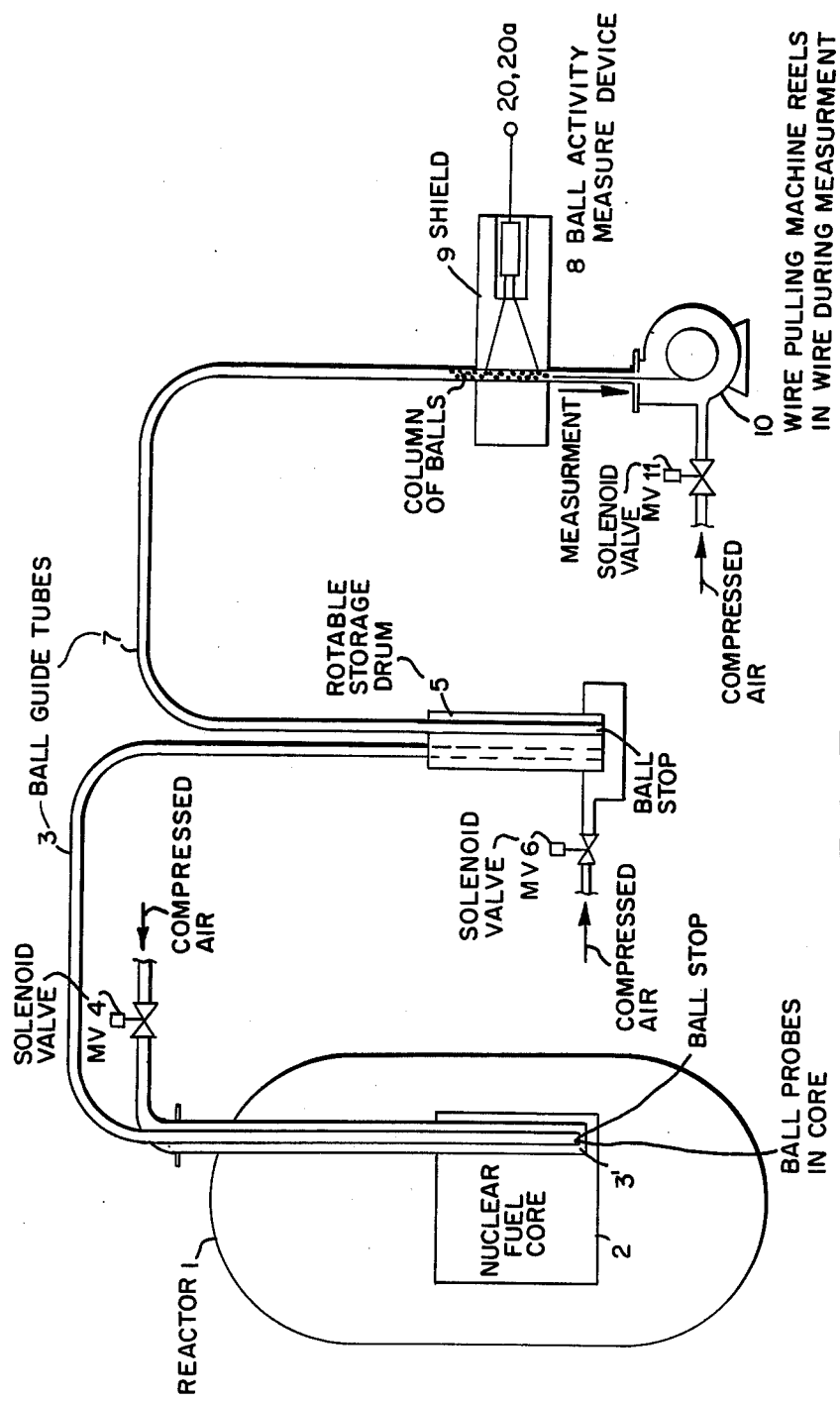
Figure 4:
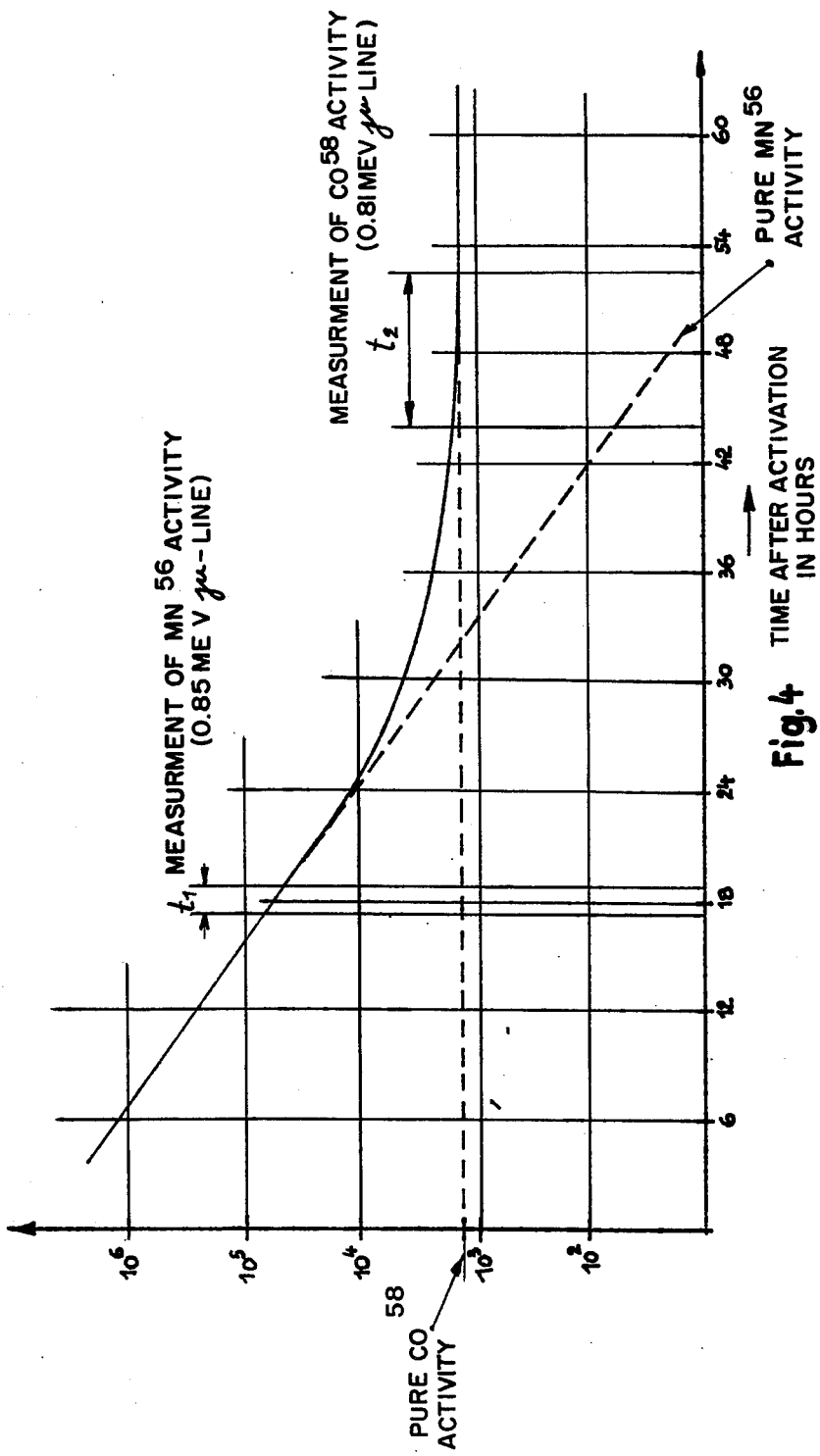
Figure 5:
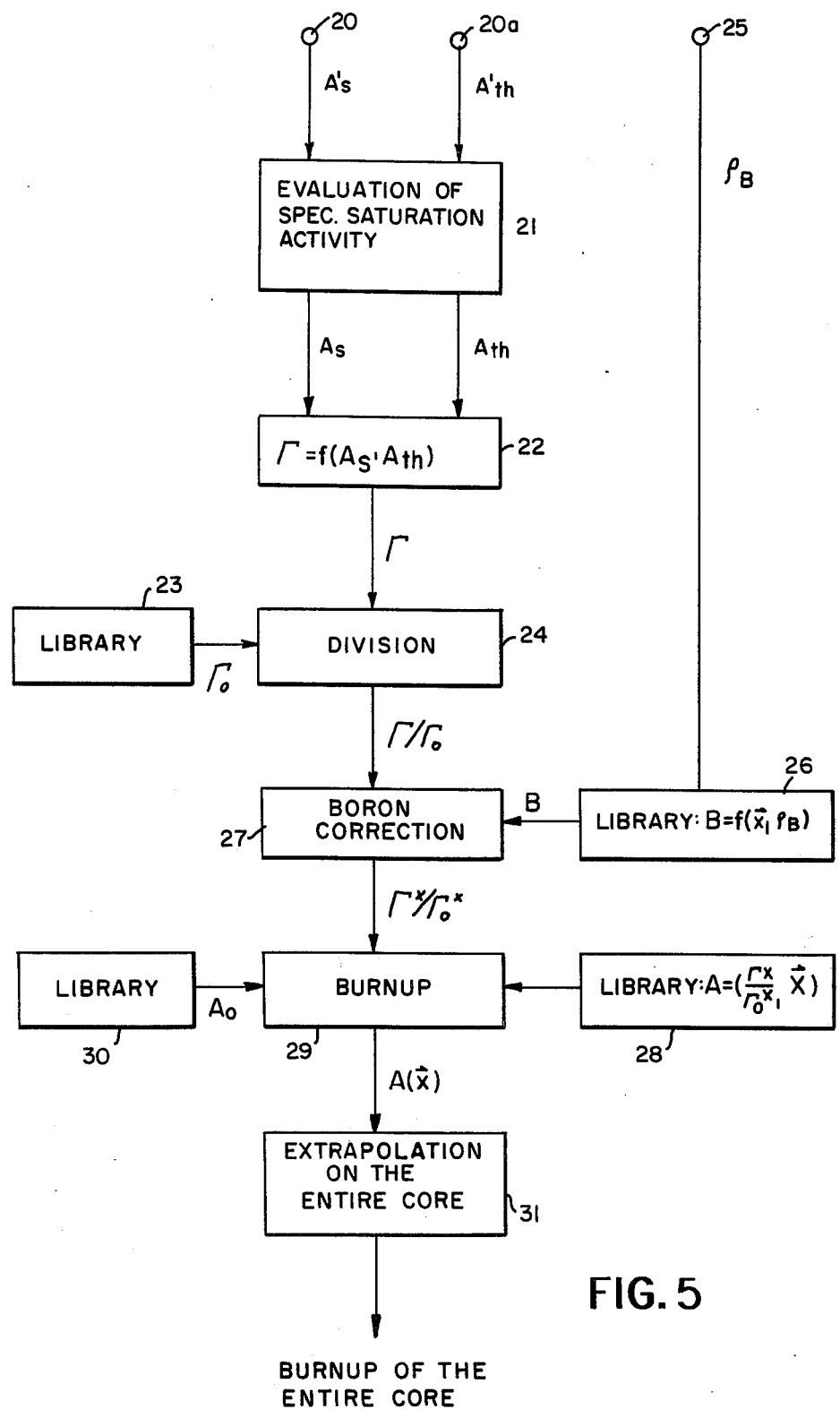

FIG. 3 schematically shows a ball measuring system;

FIG. 4 is a graph showing a specific decay curve;

FIG. 5 is a block graph of an apparatus for measuring the burn-up according to the invention; and FIG. 6 is a graph showing comparisons between known measuring systems and the system according to this invention.

The computation may be made not only on the basis of the epithermal/thermal flux ratio but may be based on any other ratio of the flux densities of two selected neutron groups or energies. The local burn-up changes the local epithermal/thermal flux ratio in a predetermined manner. The epithermal/thermal flux ratio $\Gamma(x)$ is defined as the ratio of the flows of the fast and the thermal neutron groups or energies:

$$\Gamma(\vec{x}) = \frac{\int_{E_{ET}=0.625 \text{ eV}}^{10 \text{ MeV}} \phi(E, \vec{x}) \, dE}{\int_{0}^{E_{ET}=0.625 \text{ eV}} \phi(E, \vec{x}) \, dE} = \frac{\phi_s(\vec{x})}{\phi_{th}(\vec{x})}$$

wherein
$\Gamma(\vec{x})$ = local epithermal/thermal flux ratio
$\phi(E,\vec{x})$ = local neutron flux dependent on neutron energy
$E_{ET}$ = epithermal cut off energy
$\phi_s(\vec{x})$ = local epithermal neutron flux
$\phi_{th}(\vec{x})$ = local thermal neutron flux However, the interrelationship between the epithermal/thermal flux ratio $\Gamma$ and burn-up $A$ is not monotone for the entire burn-up range because the boron content $\rho_B$ of the cooling medium is changed as the burn-up increases for reasons of reactivity. Further influences disturbing the spectrum-burn-up relationship include the structural materials of the reactor, the control rods, and the cooling medium temperature dependent on the locale.

These disturbing influences can be eliminated by correlation or importance functions in a diffusion program. The change of the epithermal/thermal flux ratio $\Delta\Gamma(\vec{x})$ in the xenon equilibrium condition may be approximated by the following equation if terms of higher order are neglected:

$$\Delta\Gamma(\vec{x}) = \left(\frac{\delta\Gamma(\vec{x})}{\delta A}\right)\Delta A + \left(\frac{\delta\Gamma(\vec{x})}{\delta\rho_B}\right)\Delta\rho_B + \sum_K \left(\frac{\delta\Gamma(\vec{x})}{\delta\rho_{SK}(\vec{x})}\right)\Delta\rho_{SK}(\vec{x}) \quad (1)$$

wherein $A$ = burn-up
$\rho_B$ = concentration of boron
$\rho_{SK}$ = local influences of structural materials, control rods, temperature, etc.

If $\Gamma(x, t_o)$ is the calibrating measurement of the ratio at a time $t_o$, the following equation is derived from equation (1), above, for burn-up $A(\vec{x},t)$ at time $t_o$ $$A(\vec{x}, t) = \left\{ \Gamma(\vec{x}, t) - \Gamma(\vec{x}, t_o) - \left(\frac{\delta\Gamma(\vec{x})}{\delta\rho_B}\right)_{t'}\left[\rho_B(t) - \rho_B(t_o)\right] - \sum_K \left(\frac{\delta\Gamma(\vec{x})}{\delta\rho_{SK}(\vec{x})}\right)_{t'}\left[\rho_{SK}(\vec{x}, t) - \rho_{SK}(\vec{x}, t_o)\right] \right\} \left(\frac{\delta A(\vec{x})}{\delta\Gamma(\vec{x})}\right)_{t'} + A(\vec{x}, t_o) \quad (2)$$

$t_o < t' < t$

Figure 1:
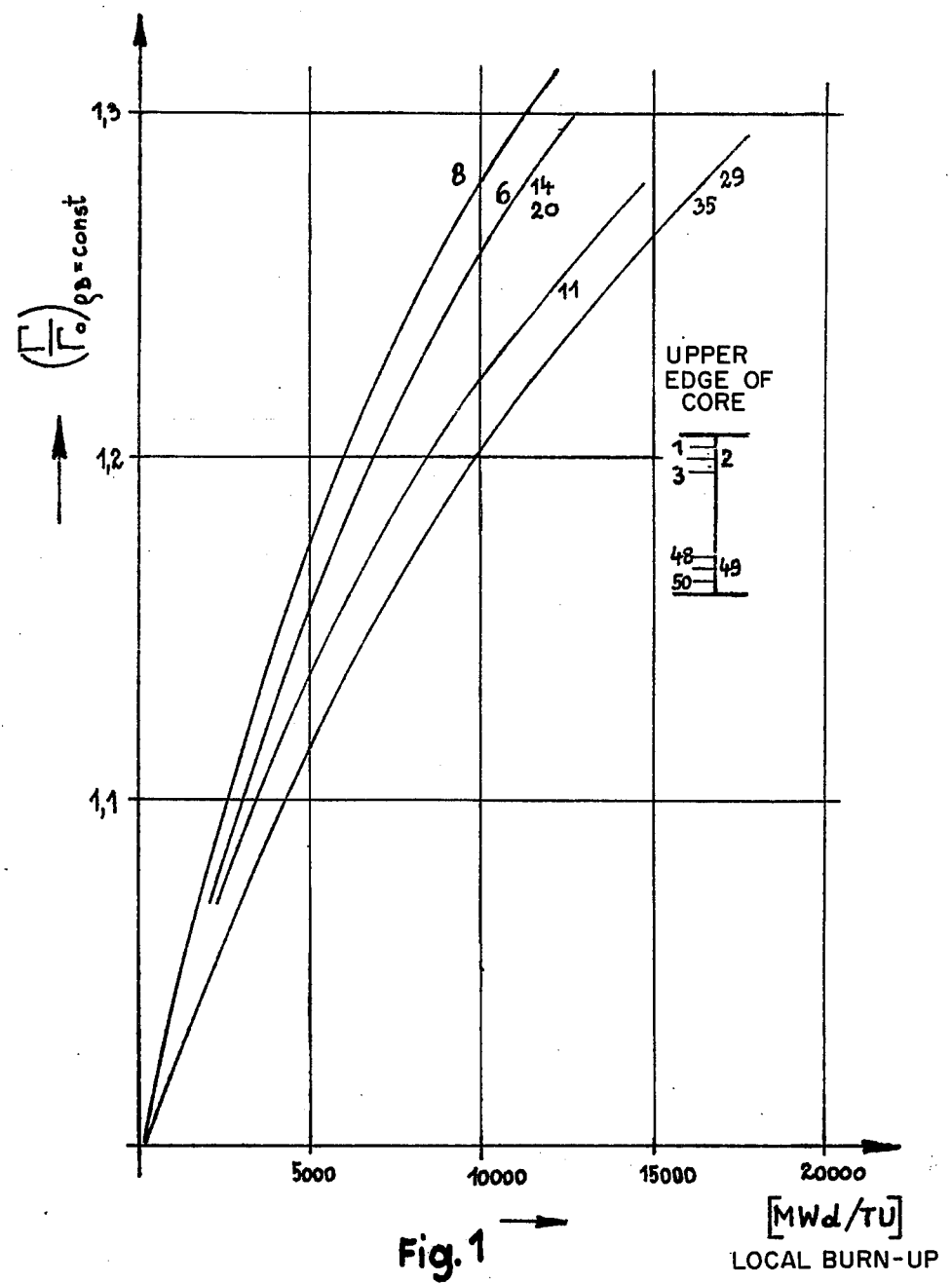
FIG. 1 shows a graph of the epithermal/thermal flux ratio which is a function of the burn-up in a boron-modified reactor.
Figure 2:
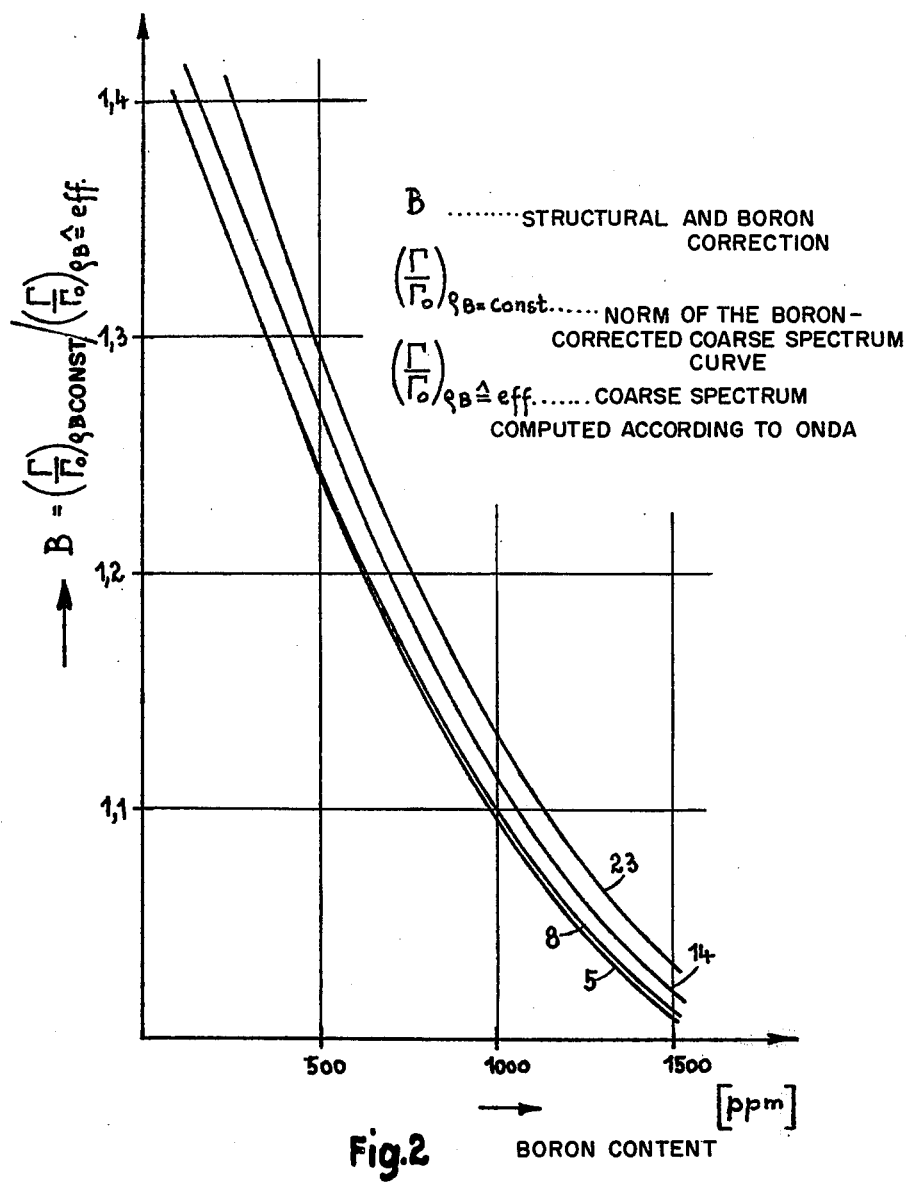
FIG. 2 is a graph showing the boron and structural correction factors of the epithermal/thermal flux ratio.

In practical terms, the change in the epithermal/thermal flux ratio may be derived from computations with a burn-up program including the disturbance variables $$\frac{\delta \Gamma(\vec{x})}{\delta \rho_{SK}(\vec{x})} \text{ and } \frac{\delta \Gamma(\vec{x})}{\delta \rho_H}$$

so as to obtain a ratio $\Gamma(x,t)$ corrected for boron content and structural material influences, which is a definite and monotone function of the burn-up (see FIG. 1):

$$\Gamma^x(\vec{x}, A(t)) = \Gamma(\vec{x}, t) B(\vec{x}, \rho_H(t), \sum_K \rho_{SK}(\vec{x}, t)) \quad (3)$$

wherein $$B(\vec{x}, \rho_H(t), \sum_K \rho_{SK}(\vec{x}, t))$$

is a total correction factor derived from the following equation if terms of higher order are neglected (see FIG. 2):

$$B(\vec{x}, \rho_H(t), \sum_K \rho_{SK}(\vec{x}, t)) \cong B_H(t) B_s\left(\vec{x}_1, \sum_K \rho_{SK}(\vec{x}, t)\right) =$$

$$\left\{1 - [\rho_H(t) - \rho_H(t_o)]\left(\frac{\delta \Gamma(\vec{x})}{\delta \rho_H}\right)_{t'} \frac{1}{d\Gamma}\right\}\left\{1 - \sum_K [\rho_{SK}(\vec{x}, t) - \rho_{SK}(\vec{x}, t_o)]\left(\frac{\delta \Gamma(\vec{x})}{\delta \rho_{SK}(\vec{x})}\right)_{t'} \frac{1}{d\Gamma}\right\} \quad (4)$$

Using (4), the following simplified equation is derived from equation (2):

$$A(\vec{x}, t) = \left[\Gamma(\vec{x}, t) B\left(\vec{x}_1, \rho_H(t), \sum_K \rho_{SK}(\vec{x}, t)\right) - \Gamma(\vec{x}, t_o) B\left(\vec{x}_1, \rho_H(t_o), \sum_K \rho_{SK}(\vec{x}, t_o)\right)\right]\left(\frac{\delta A(\vec{x})}{\delta \Gamma^x(\vec{x})}\right)_{t'} + A(\vec{x}, t_o)$$

$$= \Delta \Gamma^x(\vec{x}, t)\left(\frac{\delta A(\vec{x})}{\delta \Gamma^x(\vec{x})}\right)_{t'} + A(\vec{x}, t_o) \quad t_o < t' < t \quad (5)$$

Thus, the locale burn-up $A(x,t)$ may be determined by measuring the epithermal/thermal flux ratio while taking into account the influence of the boron content and the structure.

The method of the present invention has been tested in the nuclear power station Obrighein, German Federal Republic (hereinafter called KWO), by using the ball measuring system which is known e.g. from DAS (German Published Patent Application) No. 1,930,439 for measuring the neutron flux distribution in pressurized water reactors (PWR). The flux ratio $\Gamma^x(x,t)$ was computed from a single measurement by activating the column of balls of the generally conventional ball measuring system installed at KWO schematically shown in FIG. 3. This system includes indicator nuclides $Ni^{58}$ and $Mn^{55}$. The two activities $Co^{58}$ (fast activation of $Ni^{58}$) and $Mn^{56}$ (thermal activation) were separated in time by their different half-lifes of 72 and 2.57 h, respectively. The balls of this ball measuring system were made of the alloy "Incoweld" which has the following composition: 70% Ni, 15–17% Cr, 8% Fe, 2.75–3.35% Ti, 2–2.75% Mn and traces of Cu, C, Al, Si and S.

FIG. 4 shows a decay curve of activated "Incoweld" balls. This type of probe material is advantageous because of its high nickel content which delivers a sufficient threshold detector activity and because the decay gammalines of $Co^{58}$ and $Mn^{56}$ are almost the same (0.81 and 0.85 Mev), which permits the adjustment of the discriminator threshold of the electronic measuring instrument to be maintained unchanged.

The two activities $Co^{58}$, $Mn^{56}$ (see output 20, 20a in FIG. 3) for the evaluation of the burn-up can be obtained by measuring the ball column by device 8 (FIG. 3) at two different time intervall $t_1$, $t_2$ (FIG. 4). The $E_1$ activation, decay and measuring times are so chosen and correlated that, under the chosen measuring conditions, the pulse rates are high enough to provide a good statistical survey while the disturbing influence of complementary activity is less than 1%.

In the ball system used at KWO, as illustrated in FIG. 3, measurements were taken in 5.5 cm sections of the column of balls so that the height of the reactor (2.7 m) was divided into 50 axial compartments. As schematically shown in FIG. 3, nuclear reactor 1 contains shielded nuclear fuel core 2 into which extends guide tube 3 for a test column of balls, the end of the guide tube in the core being closed off at 3'. Solenoid valve 4 permits controlled introduction of compressed air to convey the balls into the portion of the guide tube extending axially into core 2.

The opposite end of U-shaped guide tube 3 extends into rotatable storage drum 5 which also receives one end of second guide tube 7. Solenoid valve 6 permits controlled introduction of compressed air into the drum to convey the balls between the two guide tubes. Thus, after the balls have been exposed to radiation in the nuclear reactor core to activate the different components of the alloy, they are conveyed through guide tube 7 to measuring device 8 surrounded by radiation shield 9, the measuring device producing measuring signals which are at the chosen time intervals a function of the flux of the neutron energy and of each component of the alloy of which the balls are made. During the measurement, the column of balls is moved past the measuring device by a wire reeled in a wire pulling machine 10. Another solenoid valve 11 permits compressed air to be delivered into the end of the guide tube 7 to convey the balls back into the storage drum after measurement. Instead of a column of balls, a helical spring can be used.

Since the measured epithermal/thermal flux ratio change between the new and burnt up nuclear fuel core amounts only to about 20% to 30% (a little more if plutonium is used as fuel), the pulse rates of the indicator nuclides used to indicate the flux ratio must have a sufficiently good statistic. The flux ratios $\Gamma(x,t)$ are computed from the ratio of the pulse rates of the activation of nickel by fast neutrons ($A_{Ni}^s$) at time $t$ by the reaction $$Ni^{58}(n,p)Co^{58}$$

and of the activation of manganese by thermal neutrons ($A_{Mn}^{th}$) by the reaction $$Mn^{55}(n,\gamma)Mn^{56}$$

according to the following equation (with Mn and Ni being paired as indicator nuclides):

$$\Gamma = \frac{\sigma_{Mn} \dfrac{A_{Ni}^s}{A_{Mn}^{th}}}{I_{Mn}^{res} \dfrac{A_{Ni}^s}{A_{Mn}^{th}} - I_{Ni}^s} \qquad (6)$$

If thermal neutron absorbers are combined with epithermal activation components of different magnitudes, for instance manganese and vanadium, the following equation prevails:

$$\Gamma = \frac{\sigma_{Mn} - \sigma_V \dfrac{A_{Mn}^{res}}{A_V^{res}}}{I_1^{res} \dfrac{A_{Mn}^{res}}{A_V^{res}} - I_{Mn}^{res}}$$

wherein $I^{res}$ = resonance integral
$I^s$ = mean cross section of the threshold reaction of fast flux $\phi_s$
$\sigma$ = thermal activation cross section In FIG. 5, the pulse rates $A'_s$, $A'_{th}$ are converted with known magnitudes to specific saturation activities (block 21). Thereupon the epithermal/thermal flux ratio is determined according to equation (6) at block 22 and then the quotient is formed at block 24 by using the locally dependent value $\Gamma_o(\overrightarrow{x})$ from the library (block 23). The boron concentration $\rho_B$ is used as an additional input at 25 for measurement. With the aid of the boron concentration and taking into account the locale $\overrightarrow{(x)}$, correction factor B is received from the library (block 26) to correct for boron content (block 27). In block 29, the computer executed equation (5) by obtaining from the library (block 28) those values $A(\overrightarrow{x})$ and $$\frac{\delta A}{\delta \Gamma^r}(\overrightarrow{x})$$

which meet the requirements of equation (5). The burn-up condition $A_o$ of the reference measurement, received from the library (block 30), permits the determination of the actual local burn-up A. A further program (block 31) extrapolates to the entire reactor core and thus to the local burn-up condition of each fuel element.

FIG. 6 is a graph of the axial curve of the burn-up in the nuclear fuel core of the KWO reactor, comparing the results of several known burn-up measurements and measurements according to the present invention. The results of the measurement according to the invention are indicated with +. Even a one-dimensional diffusion burn-up program for computing A( ) shows that the results conform closely to the classical measuring methods (gamma-scan, power density integration). The deviations are less than 3%. The required measuring time for determining the burn-up with the illustrated ball measuring system is about 60 hours and is essentially determined by the required decay time (see graph of FIG. 4).

In the ball measuring system of the nuclear power plant at Stade, Federal German Republic (hereinafter called KKS), manganese and vanadium are used as indicator nuclides. This permits a reduction of the total measuring time to about 2 hours, about a quarter of an hour being required for the decay of the vanadium activity.

A combination of the indicator nuclides vanadium and nickel is particularly useful, measuring times of about two hours being required for the entire core with these activity components. Furthermore, tests have shown that the measuring time may be reduced with the use of non-linear filters.

It is also possible by means of the burn-up measuring system of the present invention to measure the burn-up of operating boiling water nuclear reactors which have fixedly arranged fission chambers and calibrating chambers associated therewith and arranged to be moved during the operation through guide tubes distributed through the nuclear fuel core. Measurements are effected in such reactors by introducing additional fission chambers charged with a different fissile material into a respective one of the guide tubes to produce the measuring signals for comparison. The measuring signals are computed when the movable additional fission chamber is at the level of the associated fixed fission chamber. Two or more additional fission chambers may be formed into a structural unit and moved simultaneously into the nuclear fuel core.

In any event, according to this invention, the measurement of the burn-up is effected by comparing at least two measuring signals derived from activity detectors, such as fission chambers, which are moved into the core and/or at fixedly mounted therein. The detectors have a different sensibility for different neutron groups or energies so that the comparison of at least two detector signals produces the coarse spectrum or a like parameter correlated to the burn-up.

What is claimed is:

1. A method of measuring burn-up of nuclear fuel in a nuclear reactor including a core, comprising the steps of introducing a neutron flux probe of constant composition of at least two different nuclides which deliver two separable activities produced by two different neutron energies to a measuring point of the reactor core the burn-up of which is to be measured during operation of the reactor, the probe producing two measuring signals, each measuring signal being a function of the local flux of a different neutron energy changing with the burn-up at the measuring point, comparing the two signals and computing the burn-up on the basis of the comparison.

2. The method of claim 1, wherein the probe is moved into into the reactor core, the probe being capable of delivering two separable activities with at least two different neutron energies, the probe is permitted to remain in the nuclear fuel for a predetermined period of time, the probe is then removed and subjected to a measurement of the activities, and the burn-up is computed by comparing at least two of the activities.

3. The method of claim 2, wherein the activities are separable by their decay characteristics, the number of pulses of each energy is determined in at least two measuring channels associated with the activities, and the burn-up is computed by comparing the determined numbers of pulses.

4. The method of claim 2, wherein the activities are separable in time, at least two activity measurements are made in at least two predetermined time intervals, and the burn-up is computed by comparing the activity measurements.

5. The method of claim 2, wherein the probe is constituted by a column of balls or a helical spring, and the column of balls is introduced into the nuclear fuel through guide tubes distributed through the core.

6. The method of claim 2, wherein the probe comprises manganese and a metal selected from the group consisting of nickel, vanadium and gold, or vanadium and nickel.

7. The method of claim 6, wherein the probe also comprises a metal selected from the group consisting of iron, chromium and titanium.

8. The method of claim 1, wherein fission chambers are located in the fuel, the fission chambers being charged with different fissile materials, and the measuring signals are produced in the fission chambers.

9. The method of claim 8, whrein the fission chambers are fixedly arranged in the nuclear fuel.

10. The method of claim 8, wherein the fission chambers are temporarily introduced into the nuclear fuel to produce the measurements.

11. The method of claim 8, wherein at least two of the fission chambers are formed into a structural unit.

12. The method of claim 8, wherein the reactor has fixedly arranged fission chambers and associated calibrating chambers arranged to be moved through guide tubes distributed through the nuclear fuel during the operation of the reactor, comprising the steps of introducing additional fission chambers charged with a different fissile material into a respective one of the guide tubes to produce the measuring signals for comparison, the measuring signals being computed when the movable additional fission chambers are at the level of the associated fixed fission chambers.

13. An apparatus for measuring burn-up of nuclear fuel in a nuclear reactor, comprising two fission chambers of different sensitivity constant in time with respect to the local neutron spectrum of the reactor and changing as a function of the local burn-up, the fission chambers being arranged in the reactor core at a measuring point and each fission chamber producing a measuring output signal, each measuring output signal being a different function of the local neutron energy distribution changing as a function of the burn-up, and means designed to compute a value associated with the local burn-up on the basis of comparison of the two output signals.

14. An apparatus for measuring burn-up of nuclear fuel in a nuclear reactor, including a core and guide tube means leading into the core, said guide tube means having an activation section within the core, comprising
  1. a measuring system comprising elements of an alloy of at least two components having a constant mixing ratio, the components of the elements delivering two separable activities produced by two different neutron energies, and the elements being movable through the activation section of the guide tube means into the reactor core,
  2. a detector unit outside the reactor and connected to the measuring system, the movable elements being received from the activation section in the reactor core through the guide tube means,
      a. the detector unit producing measuring output signals, each measuring output signal being a different function of the local neutron energy distribution changing as a function of the burn-up in the activation section, and
  3. means arranged to receive and compare the output signals and designed to compute a value associated with the local burn-up on the basis of comparison of the output signals.

15. The apparatus of claim 14, wherein the elements are balls.

16. The apparatus of claim 14, wherein the elements consist of a helical spring.

* * * * *